May 3, 1932.                M. KEVELSON                 1,856,392
                       IMPREGNATED CONDENSER UNIT
                          Filed June 14, 1928
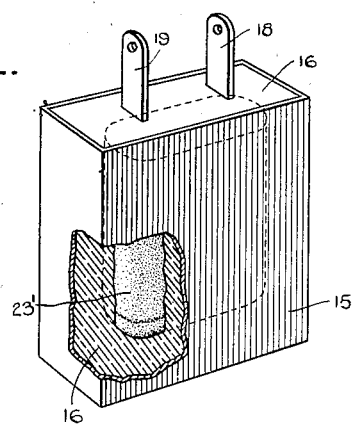
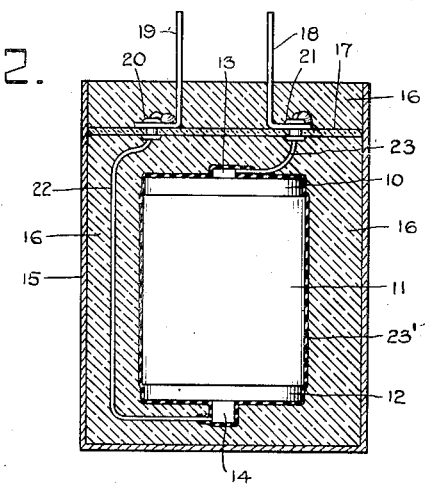
INVENTOR
MAX KEVELSON Patented May 3, 1932

1,856,392

UNITED STATES PATENT OFFICE

MAX KEVELSON, OF NEW YORK, N. Y., ASSIGNOR TO CONDENSER CORPORATION OF AMERICA, OF JERSEY CITY, NEW JERSEY, A CORPORATION OF NEW YORK

IMPREGNATED CONDENSER UNIT

Application filed June 14, 1928. Serial No. 285,242.

My present invention relates generally to electrical condensers, and has particular reference to a condenser unit of the character wherein an impregnated condenser body is completely enveloped within a mass of sealing substance.

The type of condenser body to which my invention has particular reference is generally formed by interwinding strips of conducting material and strips of non-conducting material. Foil and paper are usually employed for this purpose. The condenser body is then compressed into a substantially flattened condition and subjected to suitable impregnating procedure whereby a selected dielectric material permeates thoroughly throughout the condenser body, filling in all the interstices of the paper layers and thereby insulating the conducting layers of foil from one another in a manner suitable for the contemplated purpose.

One or more of such impregnated bodies are usually enclosed within a mass of sealing substance which fills an outer casing or container, the necessary number of terminals projecting from the outer surface of the mass and being in electrical connection with the respective selected terminals of the body or bodies. It is in this condition that the condenser unit is ready for sale or installation.

It has been found generally satisfactory to employ a single class of material for both the impregnating and the sealing purposes. For example, sealing wax has proven to be a satisfactory sealing substance for completely enveloping the impregnated condenser body, and paraffin wax has heretofore been widely employed as the impregnating medium.

Where different materials are used for impregnating and sealing purposes, certain difficulties arise, particularly where the two diverse materials are coactive toward one another.

It is one object of my present invention to provide a condenser unit wherein diverse mutually coactive materials are employed for impregnation and sealing, respectively, and wherein means have been provided for obviating and overcoming the difficulties which such a construction presents.

Coordinately, it is an object of my invention to provide a novel method of manufacture of condenser units of the character mentioned, my method involving the employment of diverse materials for sealing and impregnating, and the provision of procedural steps for rendering such employment feasible.

One feature of my invention resides in providing a condenser unit wherein the enveloped and impregnated condenser body is insheathed within a protective coating which is uncoactive toward both the impregnating material and the enveloping sealing substance. From a procedural standpoint, it is a feature of my invention to insheath an impregnated condenser body with a suitably selected protective coating prior to the submersion or enveloping of the impregnated condenser body within the mass of sealing substance.

More particularly, my invention relates to condenser units wherein the previously referred to condenser bodies are impregnated with a material which includes oil as an ingredient. Where oil is employed either alone or in intimate intermixture with one or more other ingredients, I have found that the employment of ordinary sealing wax as the sealing substance has an impairing effect upon the condenser unit, primarily because of the fact that oil and sealing wax are coactive toward one another. It appears that oil and wax are capable of forming a colloidal solution or similar intimate union. As a result, I have found that the ordinary construction and the usual procedural steps of manufacture have been beset with difficulties, the resultant condenser units having been found to become defective after very short periods of use.

It is therefore a more specific object of my invention to provide a condenser unit wherein an oil-impregnated condenser body is completely enveloped within a sealing substance such as the well known and customarily employed sealing wax; and wherein the condenser body is insheathed in a protective coating of material uncoactive toward both the oil in the condenser body and the sealing wax mass surrounding the same. I have found an oil-proof wax to be highly satisfactory for this purpose, such a wax being of a suitably strong protective character, having the necessary dielectric or non-conducting qualities, being comparatively inexpensive, being simple to employ without a material alteration of the usual processes, and being neutral so far as activity is concerned, toward both the oily impregnating material and the surrounding sealing substance of wax.

For the attainment of the foregoing objects and such other objects as may hereinafter appear or be pointed out, I have illustrated one form of my invention in the accompanying drawings, in which—

Figure 1 is a perspective view of a condenser unit constructed in accordance with the present invention, a portion thereof being broken away to disclose the inner construction; and Figure 2 is a vertical cross-sectional view.

I first provide a wound or rolled condenser body by interwinding in alternate relationship a foil strip 10, a pair of non-conducting strips 11, and a foil strip 12. The non-conducting strips 11 may each be formed of one or more layers of suitable paper, and the winding procedure is such that one edge of the foil strip 10 projects from one end of the condenser body while a corresponding edge of the foil strip 12 projects from the opposite end of the condenser body.

This wound condenser body is compressed into a substantially flat condition, and terminal strips 13 and 14 are associated respectively with the strips 10 and 12. These terminal strips project outwardly from the opposite ends of the condenser body and afford means for establishing electrical connection with the two mutually insulated conductors of the condenser.

The condenser body is then subjected to suitable heat and vacuum treatment and is impregnated with a material which includes oil as an ingredient. The oil I prefer to employ is petroleum mineral oil of either paraffin or napthalene base.

I provide an outer container 15 which may be of metal or similar rigid material, the container 15 being adapted to receive a mass of sealing substance 16, such as ordinary sealing wax.

A transverse disc or plate 17 is provided with the upstanding terminals 18 and 19 which may be attached in any suitable manner as by means of the eyelets 20 and 21.

The impregnated condenser body is ultimately to be enveloped within the sealing substance 16 as shown in the drawings. Where sealing wax is employed, the condenser body is first associated with the disc 17 and the terminals 18 and 19 by arranging leads 22 and 23 in such a manner that the terminals 18 and 19 are respectively connected with the terminal strips 13 and 14 of the condenser body. This assembly is then placed into the container 15 and molten sealing wax is poured into the container.

In accordance with my present invention, the impregnated condenser body is not immediately associated with the disc 17 nor with the container 15, but is first provided with a protective coating 23', of material which is uncoactive toward the oily impregnating medium and toward the sealing substance in which the condenser body is to be enveloped.

I have found it highly satisfactory to employ an oil-proof wax for the purpose of providing the coating 23'. Although such coating may be applied in any desired manner, I prefer to immerse one or more of the condenser bodies, after the usual impregnation thereof, into a bath of molten oil-proof wax. When the condenser bodies are removed and the wax is allowed to cool, a thin protective coating 23' hardens around the condenser body and snugly insheaths the same. The leads 22 and 23 are advantageously associated with the terminals 13 and 14 prior to the provision of the protective coating 23' around the condenser body.

Among the waxes which I have found to be unreactive toward oil are ozocerite, preferably of the hard green variety, hard stearin pitch, varnish, shellac, and a number of other similar waxes known in the trade.

This impregnated and protectively coated condenser body is then associated with the disc 17 by attaching the leads 22 and 23, as by soldering, to the proper terminals ultimately to be exposed on the outside of the unit. Thereupon, the condenser body and the disc 17 are inserted into the container 15 and the molten sealing wax is applied so as to fill the container 15 and completely envelope and enclose all of the elements except the projecting ends of the terminals 18 and 19.

It will be obvious that changes in the details herein described and illustrated for the purpose of explaining the nature of my invention may be made by those skilled in the art without departing from the spirit and scope of the invention as expressed in the appended claims. It is therefore intended that these details be interpreted as illustrative, and not in a limiting sense.

Having thus described my invention and illustrated its use, what I claim as new and desire to secure by Letters Patent is—

1. In an electrical condenser unit, the combination with a container and a hardened sealing substance therein, of a condenser body within said substance and impregnated with a material having coactivity toward said substance, and a protective coating insheathing said body and comprising a material uncoactive toward either the impregnating material or the sealing substance.

2. In an electrical condenser unit, the combination with a container and a hardened sealing wax therein, of a condenser body within said wax and impregnated with a material having coactivity toward said wax, and a protective coating insheathing said body and comprising a material uncoactive toward either the impregnating material or the sealing wax.

3. In an electrical condenser unit, the combination with a container and a hardened sealing wax therein, of a condenser body within said wax and impregnated with a material having coactivity toward said wax, said material comprising oil, and a protective coating of oil-proof and wax-proof material insheathing said body to prevent any coaction between the impregnating material and the sealing wax.

4. In an electrical condenser unit, the combination with a container and a hardened sealing substance therein, of a condenser body within said substance and impregnated with a material having coactivity toward said substance, and a protective coating insheathing said body and comprising a wax which is uncoactive toward either the impregnating material or the sealing substance.

5. In an electrical condenser unit, the combination with a container and a hardened sealing wax therein, of a condenser body within said wax and impregnated with a material having coactivity toward said wax, and a protective coating insheathing said body and comprising a wax which is uncoactive toward said impregnating material.

6. In an electrical condenser unit, the combination with a container and a hardened sealing wax therein, of a condenser body within said wax and impregnated with a material having coactivity toward said wax, said material comprising oil, and a protective coating of oil-proof and wax-proof material insheathing said body to prevent any coaction between the impregnating material and the sealing wax, said protective coating comprising an oil-proof wax.

In witness whereof I have signed this specification this 12th day of June, 1928.

MAX KEVELSON.